March 12, 1974  G. LEHMANN ET AL  3,796,606
CYLINDRICAL ELECTROCHEMICAL CELL
Filed May 11, 1972  2 Sheets-Sheet 1

FIG. 2
FIG. 3
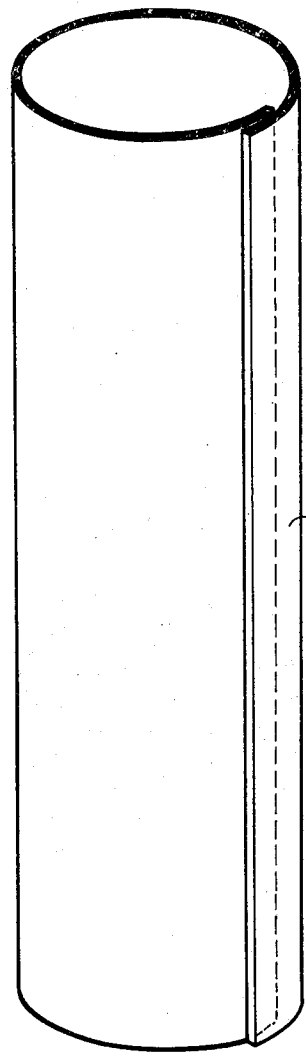
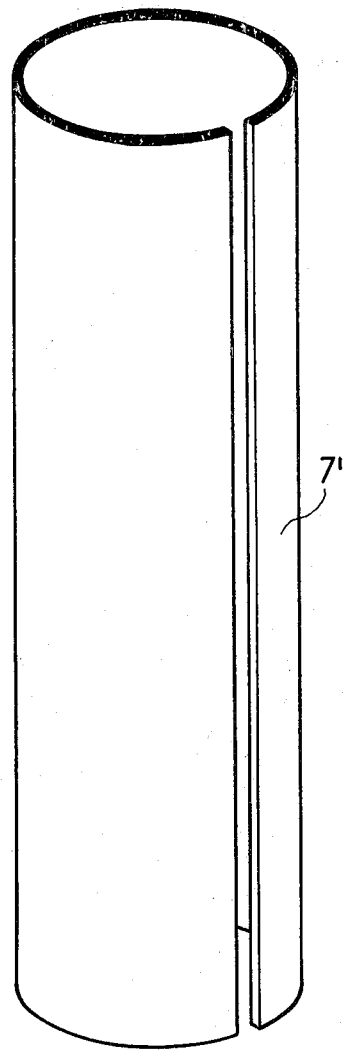

United States Patent Office 3,796,606
Patented Mar. 12, 1974

3,796,606
CYLINDRICAL ELECTROCHEMICAL CELL
Gerard Lehmann, Liguge, and Joseph Delhommois, Poitiers, France, assignors to Saft-Societe des Accumulateurs Fixes et de Traction, Romainville, France
Filed May 11, 1972, Ser. No. 252,454
Claims priority, application France, Nov. 26, 1971, 7142494
Int. Cl. H01m 35/16
U.S. Cl. 136—13                         19 Claims

ABSTRACT OF THE DISCLOSURE

A cylindrical electrochemical cell whose positive electrode is in contact with the outer casing of the cell and separated by a porous separator from a negative electrode constituted by a sheet of metal having a very negative standard oxidation potential (European Scale) e.g. lithium, sodium or calcium, surrounding an elastically deformable current collector having overall generally cylindrical shape whose directrix is a substantially circular curve with two distinct ends. The elasticity of this collector enables it to maintain biased contact with the negative electrode at all times notwithstanding alternation in electrode volumes during discharge of the cell and thus to maintain the reacting surfaces of the electrodes at optimum distance by continuously biasing the negative electrode against the porous separator.

RELATED APPLICATIONS

No related applications of applicants are copending.

BRIEF SUMMARY OF INVENTION

This invention relates to electric cells and more particularly to cylindrical cells the output terminals of which are constituted by metal portions of the outer walls of the cell.

Cells of this type are more and more in general use. Their applications range from the traditional ones, such as flashlights, to the applications being now developed such as magnetic recorders and motion picture cameras, also comprising radio receivers and toys. Whatever the use, the replacement of cells is a nuisance for the user. It is therefore advantageous to provide cells with a long life. In order to obtain a long life without increasing the weight and volume of apparatus, it is necessary to increase the energy density of the cells. One way of obtaining this result is to put in practice the data collected over recent years relating to the electrochemical systems using negative electrodes made of a very light and very reactive metal, particularly such as lithium, and non-aqueous electrolytes.

Unfortunately, the properties of such systems do not allow their realization in conventional cell structures which consist in placing the negative active material in contact with the cell container, or in using it as the container material itself. This is because during discharge the metal of the negative electrode dissolves, which, due to the low specific gravity of such metal, involves a substantial decrease of the electrode volume and tends to increase the distance between the electrodes of such cells by an excessive amount. Moreover, the mechanical characteristics of such metals preclude their use for making a container.

Objects and features of the invention are to remedy these drawbacks and to provide a cylindrical electrochemical cell using a very reactive negative electrode and a non-aqueous electrolyte.

An object of the invention is the provision of a cylindrical cell, the positive electrode of which is in contact with its outer casing and is separated from the negative electrode by a porous separator, wherein the negative electrode is constituted by a sheet of a metal having a very negative (European scale) standard oxidation potential such as lithium, sodium or calcium, surrounding an elastically deformable current collector having the shape of a cylinder whose directrix is a substantially circular curve with two distinct unconnected ends.

Due to its elastic or springy properties, steel is particularly suitable material for the collector.

According to an embodiment of the invention, the directrix of hte current collector cylinder is a portion of a spiral.

According to another embodiment of the invention, the directrix of the current collector cylinder is an arc of a circle comprising nearly the whole circumference, the collector thus having the shape of a tube split along one generatrix with distinct unconnected ends.

The particular shape of the collector and its springiness or elasticity provide for continuous close engagement by the material constituting the negative electrode with the separator, the latter being also thereby maintained closely against the positive electrode.

The preferred material of the negative electrode is lithium. Sodium and calcium may also be used.

In order to obtain a good electrical contact between the negative electrode and the collector and provide for an easy construction of the cell, the material constituting the negative electrode may be point or spot welded to the collector, the latter being advantageously coated with a metal able to form an alloy with the electrode material. When the electrode material is lithium, this metal may be tin, zinc, lead, nickel, silver, cadmium or platinum.

In a preferred embodiment, the positive electrode fills a tubular space situated between the separator and the inner cylindrical wall of the cell casing and is constituted by a compressed powder active material, whose electrical conductivity and mechanical strength may be improved by the addition of a suitable conductor and a suitable binder respectively.

Copper oxide, copper sulfide, silver chromate and lead chromate are suitable active materials for the positive electrode.

The electrolyte may be a lithium perchlorate solution in an organic solvent, e.g. tetrahydrofuran or a mixture of tetrahydrofuran and a second solvent such as dimethoxyethane, propylene carbonate or dimethyl carbonate.

The lithium perchlorate concentration in this electrolyte solution may, for instance, be in the range of from 1 to 1.5 M.

Other objects and features of the invention will appear in the following detailed description in relation to the accompanying drawing, wherein:

FIG. 2 is a perspective view of the collector of the cell shown in FIG. 1; and

FIG. 3 is a perspective view of another collector embodying the invention.

DETAILED DESCRIPTION

Figure 1:
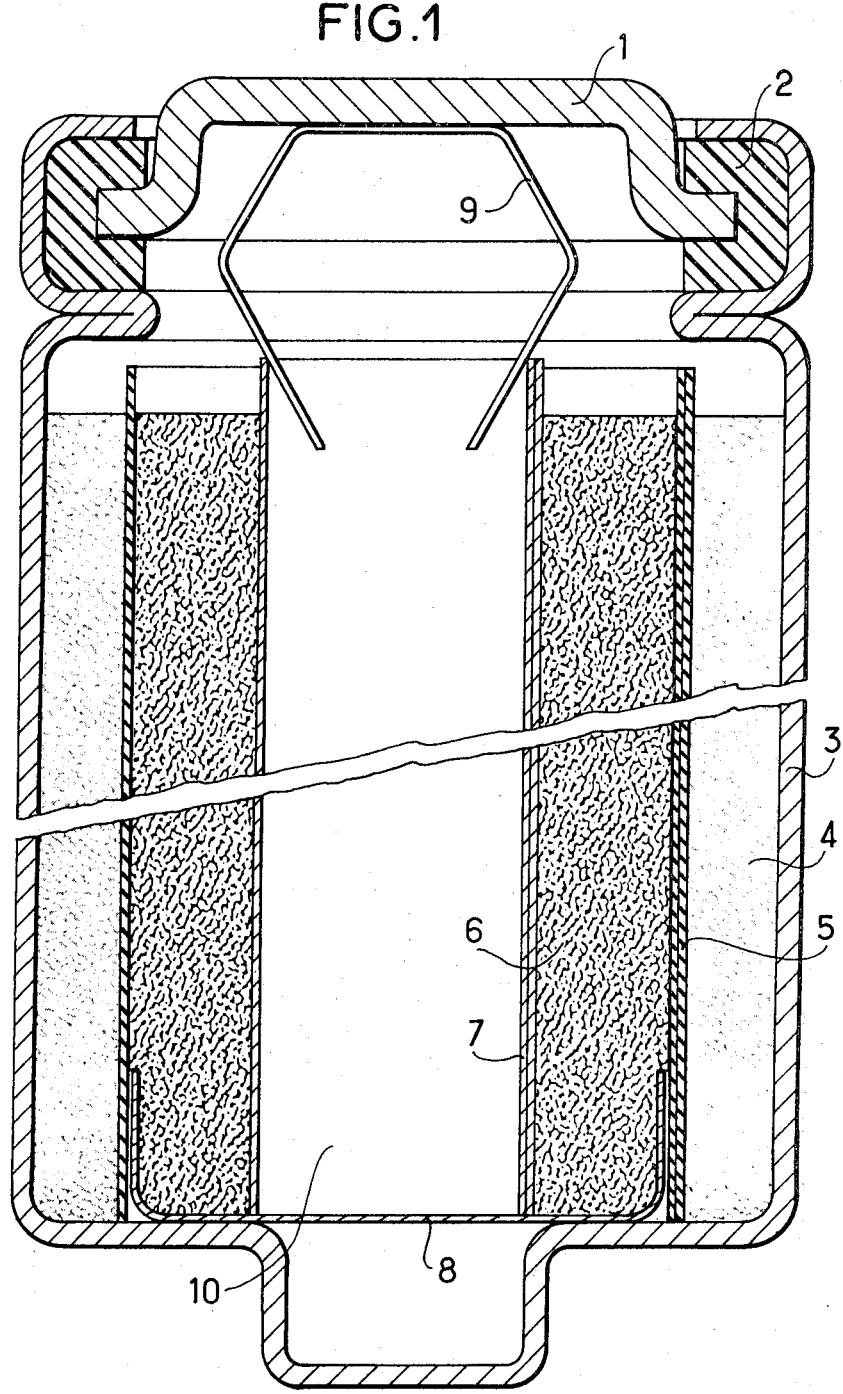
FIG. 1 is a partial sectional view of a cell embodying the invention.

Referring to the drawings, FIG. 1 shows a cylindrical cell whose casing comprises a metal casing cup 3 and a metal cover 1 separated by a sealing washer 2 made of insulating material. A positive electrode 4 comprising a compressed mixture of copper oxide and graphite, is formed into a tubular shape and mounted inside cup 3 in contact with the cylindrical inner wall of said cup.

In order to facilitate assembly of the cell, when its shape is elongated, this electrode 4 may comprise several stacked portions.

A porous sheet 5 of cellulosic paper or other suitable material such as polypropylene felt is applied against the inner surface of the positive electrode and constitutes the separator for the cell.

A negative electrode 6 is constituted by a lithium sheet wrapped around a collector 7 made of spring steel. The collector comprises a zone portion coated, for example, with tin or another of said coating metals and the lithium sheet 6 is welded at several points to this coated zone.

The negative electrode 6 and the collector 7 are insulatively separated from the cup 3 as by a cup 8 of suitable insulating material.

The said cup 3 which is in contact with positive electrode 4 constitutes the positive terminal of the cell.

The collector 7 is maintained in electrical connection with cover 1 which constitutes the negative terminal of the cell as by a bent steel blade 9 which is welded to the cover. The fingers of the blade 9 have elasticity which enables them to follow the collector when the shape of the latter is modified during use of the cell. As an alternative, the collector 7 and cover 1 may be connected as by a flexible wire welded to both.

During the assembly of the cell, the electrolyte required for its operation is introduced, and consists of a molar solution of lithium perchlorate in a mixture of tetrahydrofuran (80%) and propylene carbonate (20%). The required amount of electrolyte for the cell being larger than that retained in the pores of the positive electrode 4 and the separator 5, the excess amount of such electrolyte is housed in the inner space 10 of the collector 7.

As shown in FIG. 2, collector 7 is constituted by a spirally wound elastic steel sheet, the ends of which overlap.

As an alternative, the collector 7' shown in FIG. 3, is a split tube of elastic sheet steel. The directrix of the corresponding cylinder is an arc of a circle.

OPERATION

During the discharge of the cell a decrease in volume of the negative electrode 6 occurs, due to the dissolution of lithium in the electrolyte, and at the same time an increase in volume of the positive electrode 4 occurs due to the precipitation of lithium compounds. The decrease being more substantial than the increase, an overall decrease of the electrode volume ensues. In order to maintain the reacting surfaces at the required optimum distance, needed for proper operation, the negative electrode surface must be pushed continuously against the separator surface. To this end, collector 7 is arranged and dimensioned in such a way that it always attains a diameter superior to or at least equal to that allowed by the final volume of the electrodes, due to its elasticity. The spring, constituted by the collector 7 is therefore elastically bent or deformed when the cell is being assembled to a smaller dimension and it progressively unbends or expands during the discharge of the cell in such a way that it continuously urges the negative electrode against the separator and compensates for the overall volume decrease of the electrodes as well as maintaining optimum spacing between them.

The practice of the present invention is particularly advantageous when the cells are of a small size.

The elasticity of the connector means provides continuous intimate surface contact between facing surfaces of the casing, electrodes and separator and maintains selected optimum spacing between the positive and negative electrodes.

It is to be understood that the invention is in no way limited to the described embodiments which have only been given as examples. Details can be changed or means replaced by equivalent means within the scope of the claims without departing from the spirit of the invention. There is no intention, therefore, of limitation to the exact disclosure herein presented.

What is claimed is:

1. An electrochemical cell comprising a casing, a non-aqueous electrolyte, a porous positive electrode of powdered active material in contact with inner walls of said casing, a porous separator positioned within said positive electrode and in surface contact therewith, a negative electrode selected from the group consisting of lithium, calcium and sodium positioned within said separator in surface contact therewith and spaced a selected optimum distance from the positive electrode by said separator, the volumes of said electrodes changing during cell discharge, elastically deformable current collector means positioned within said negative electrode and in surface contact therewith and with portions of said negative electrode united to said current collector means for continuously biasing the contacting surface of said negative electrode against the contacting surface of said separator to maintain said selected optimum distance between said electrodes irrespective of changes in volume thereof during cell discharge, electrolyte in said cell, a cover for said casing, means for insulating said cover from said casing and sealing the latter, and means for electrically connecting said cover with said collector means.

2. An electrochemical cell according to claim 1 wherein said casing, said positive and negative electrodes and said separator have tubular shape and are concentrically disposed relative to each other, and said elastically deformable current collector means also has generally tubular shape with distinct unjoined longitudinally extending ends which ends are movable relative to each other during elastic alteration in dimensions of the current collector means.

3. An electrochemical cell according to claim 1, wherein said collector means is of springy conductive metal.

4. An electrochemical cell according to claim 3 wherein said conductive metal is spring steel.

5. An electrochemical cell according to claim 2 wherein said collector means is a cylinder whose directrix is a portion of a spiral and whose said unjoined ends overlap.

6. An electrochemical cell according to claim 2 wherein said collector means is a cylinder whose directrix is an arc of a circle comprising almost its entire circumference, and whose said unjoined ends are spaced apart.

7. An electrochemical cell according to claim 1, wherein a zone of said collector means in surface contact with said negative electrode is coated with a metal capable of alloying with metal of said negative electrode, and wherein said negative electrode is spot welded to said collector means in said zone.

7. An electrochemical cell according to claim 1, wherein a zone of said collector means that is in surface contact with said negative electrode includes a coating of a metal capable of alloying with metal of said negative electrode, and wherein spot welds unite said negative electrode to said collector means in said zone.

8. An electrochemical cell according to claim 7 wherein said coating is selected from metals in the group consisting of tin, zinc, lead, nickel, silver, cadmium and platinum.

9. An electrochemical cell according to claim 1, wherein said positive electrode comprises a powdered active material, a conductor and binder having tubular shape.

10. An electrochemical cell according to claim 9, wherein said active material is selected from the group consisting of copper oxide, copper sulfide, silver chromate and lead chromate.

11. An electrochemical cell according to claim 1, wherein said separator is porous and is selected from the group consisting of polypropylene felt and cellulosic paper.

12. An electrochemical cell according to claim 10, wherein said electrolyte is a solution of lithium perchlorate in an organic solvent.

13. An electrochemical cell according to claim 12, wherein the concentration of lithium perchlorate in the solution ranges from 1 to 1.5 M.

14. An electrochemical cell according to claim 1, wherein said electrolyte is a solution of lithium perchlorate in a mixture of tetrahydrofuran, and a second solvent selected from the group consisting of dimethoxyethane, propylene carbonate and dimethylcarbonate.

15. An electrochemical cell according to claim 14, wherein the concentration of lithium perchlorate in the solution ranges from 1 to 1.5 M.

16. An electrochemical cell according to claim 1, wherein said casing, said electrodes, said separator and said current collector means all have generally tubular shape, said positive electrode and said separator being porous, and said current collector defines an internal space, and where said cell contains an amount of said electrolyte in excess of the amount retained in pores of said separator and said positive electrode, said excess being housed in said space.

17. A cylindrical electrochemical cell comprising a cylindrical casing, a tubular cylindrical positive electrode within and in surface contact with said casing, a cylindrical separator inside of and in surface contact with said positive electrode, a cylindrical negative electrode of thin sheet metal selected from the group consisting of lithium, calcium and sodium inside of said separator, an elastic deformable metal current collector, said thin sheet metal negative electrode being wrapped around said current collector and welded thereto in a selected zone, and said current collector being a cylinder whose directrix is a substantially circular arc with distinct unconnected ends, said collector serving continuously to bias said thin sheet metal negative electrode toward said positive electrode irrespective of volumetric changes of either electrode during discharge and to maintain substantially uniform spacing between the electrodes.

18. A cylindrical electrochemical cell according to claim 17, wherein said directrix is a portion of a spiral.

19. A cylindrical electrochemical cell according to claim 17, wherein said directrix is an arc of a circle extending nearly the entire circumference of such circle with distinct unjoined ends.

References Cited
UNITED STATES PATENTS

| | | | |
|---|---|---|---|
| 3,116,172 | 12/1963 | Wilke et al. | 136—134 P |
| 3,069,485 | 12/1962 | Winger et al. | 136—107 |
| 3,332,802 | 7/1967 | Clune et al. | 136—107 |
| 3,627,586 | 12/1971 | Jammet | 136—107 |
| 3,510,358 | 5/1970 | Naibullin et al. | 136—107 |
| 3,288,642 | 11/1966 | Kordesch | 136—14 |
| 3,119,722 | 1/1964 | Tietze et al. | 136—13 |

DONALD L. WALTON, Primary Examiner

C. F. LeFEVOUR, Assistant Examiner

U.S. Cl. X.R.

136—20, 134